(12) United States Patent
Malone

(10) Patent No.: US 8,002,225 B1
(45) Date of Patent: Aug. 23, 2011

(54) STROLL AWAY

(76) Inventor: Maryann Malone, New York, NY (US)

( * ) Notice: Subject to any disclaimer, the term of this patent is extended or adjusted under 35 U.S.C. 154(b) by 740 days.

(21) Appl. No.: 11/831,534

(22) Filed: Jul. 31, 2007

(51) Int. Cl.
*A47B 96/06* (2006.01)
*A47F 5/08* (2006.01)

(52) U.S. Cl. ........ 248/214; 248/215; 248/339; 211/118; 211/119.004

(58) Field of Classification Search ............. 248/214, 248/215, 301, 489, 495, 496, 317, 322, 324, 248/339, 340; 211/106.01, 113, 115, 116, 211/118, 119.004, 119.006, 119.007
See application file for complete search history.

(56) References Cited

U.S. PATENT DOCUMENTS

| | | | | |
|---|---|---|---|---|
| 2,235,182 A * | 3/1941 | Weston | | 248/100 |
| 3,929,228 A * | 12/1975 | Margolin et al. | | 211/102 |
| 4,333,575 A * | 6/1982 | Wong | | 211/118 |
| 4,944,434 A * | 7/1990 | Hamilton | | 248/214 |
| 5,037,051 A * | 8/1991 | Moriello | | 248/215 |
| 5,078,276 A * | 1/1992 | Rogge et al. | | 211/18 |
| 5,810,304 A * | 9/1998 | Lehrman | | 248/215 |
| 5,842,581 A * | 12/1998 | Graefe | | 211/119.004 |
| D479,796 S * | 9/2003 | Snell | | D8/372 |

* cited by examiner

*Primary Examiner* — Tan Le
(74) *Attorney, Agent, or Firm* — Richard A. Joel, Esq.

(57) ABSTRACT

A novel device for hanging a stroller on a door or wall particularly in apartments. The invention includes a hanging bracket which fits over a door at its upper end having two hanging tubes mounted thereto extending downwardly along its length. The hanging tubes are mounted within integral cylindrical retainers on the hanging bracket by strategic placement of a pin. The orientation of the hanging tubes is modifiable by adjusting the positioning of the pin on a series of notches in the upper surface of the tube retainer so that the hanging tubes may be swiveled out of the way when not in use.

2 Claims, 4 Drawing Sheets

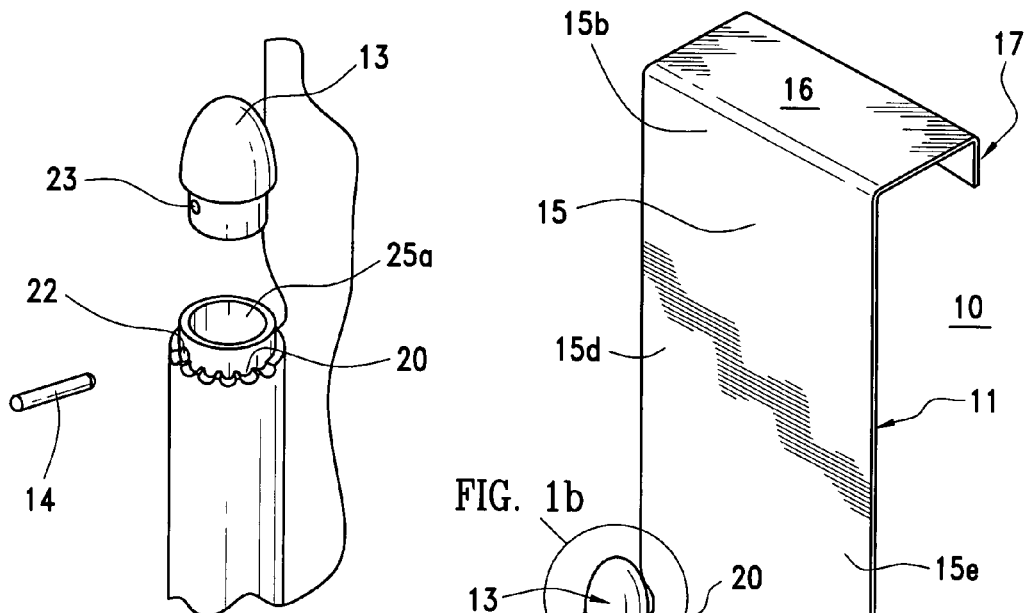
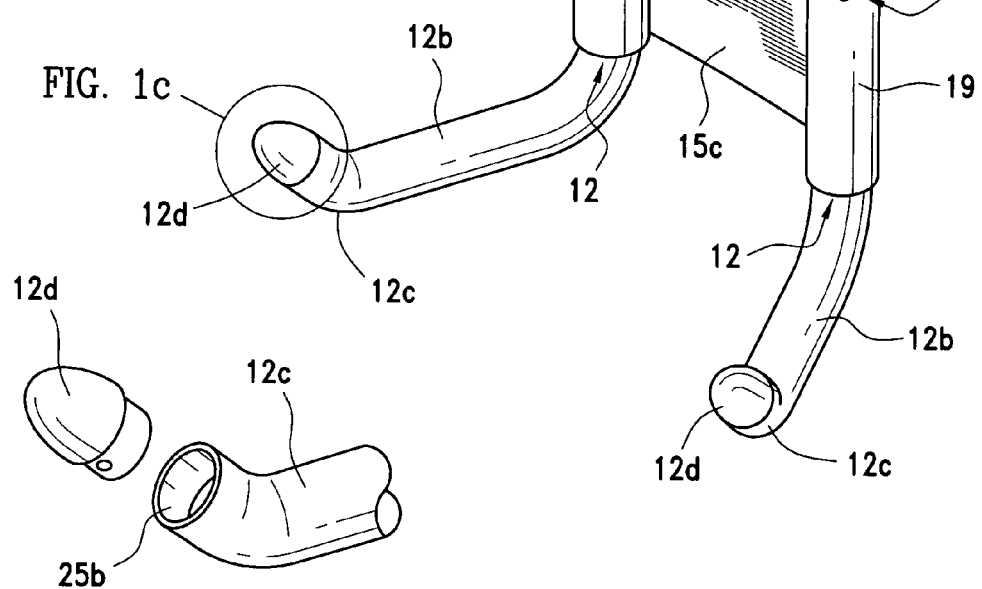
FIG. 1a
FIG. 1b
FIG. 1c

STROLL AWAY

The present invention pertains to a device for hanging a stroller, and more particularly, a device with the capacity and flexibility to support the various dimensions, weights, and shapes found in strollers.

A child stroller presents storage problems because of its size, shape, and weight. Most users typically leave the stroller resting in the garage or other room in their home, taking up valuable floor space. In apartments, such space is particularly scarce. If the user folds the stroller, it typically rests against a wall in the user's home. Many users find it inconvenient to leave their bulky strollers resting on the floor or leaning against a wall. At the same time however, users hesitate to hang the heavy strollers on merely any hook available. Additionally, not all hooks are sufficiently flexible to accommodate the vast variations found in stroller designs. The prior art discloses hooks for hanging items and the advantages of pivoting such hooks; however, it does not disclose any design with the capacity and flexibility of the present invention.

U.S. Pat. No. 5,348,166, issued to Lema, discloses a ball cap storage rack having two upper supporting hooks. The device disclosed in the Lema patent, however, differs from the present invention. First, the hooks in the Lema patent are stationary and used to support the storage rack, as opposed to the item being stored. Second, the device in the Lema patent is designed to support only light items, such as baseball caps, as opposed to heavy strollers.

U.S. Pat. No. 6,609,693, issued to Hui, discloses a hanger combination for displaying merchandise. The device disclosed in the Hui patent, however, differs from the present invention. For instance, the hanger rail in the Hui patent only pivots up or down. In addition, the device disclosed in the Hui patent appears to be incapable of supporting items having the weight of strollers.

U.S. Pat. No. 6,513,773, issued to Chang et al., discloses a structure for a wall-mounted article hanger. The device disclosed by the Chang patent, however, differs from the present invention. For instance, the device disclosed by the Chang patent is only wall-mountable. In addition, although the Chang patent discloses movable interchangeable hangers, the hangers do not move independently of each other and pivot in a horizontal plane.

U.S. Pat. No. 448,224, issued to Glover, discloses coat and hat hooks. The invention disclosed by the Glover patent differs in many ways from the present invention. For one, the Glover patent does not disclose any movable hooks. In addition, the Glover patent appears mountable only on wall surfaces.

U.S. Pat. No. 6,719,153, issued to Heneveld, discloses a storage rack for elongated items. The device disclosed in the Heneveld patent, however, differs from the present invention in a number of ways, including not having adjustable hooks and not being door-mountable.

While the above-mentioned inventions perform specific tasks and meet their objectives, they do not offer a low cost hanger device with the capacity and flexibility to support the variety of strollers currently found in the market.

The present invention discloses a novel device for hanging a stroller on a door or wall. The invention discloses a hanging assembly that can support the weight of a stroller and can accommodate the variations in stroller design. The assembly can be affixed to the top of a door ledge or directly to a wall. The invention includes a hanging bracket having two hanging tubes mounted thereto, which provide the hooks on which a stroller may hang. The hanging tubes are mounted within cylindrical retainers on the hanging bracket through use of a dowel pin. The orientation of the hanging tubes can be modified to suit the stroller design by adjusting the placement of a dowel pin in the tube on a series of teeth in the upper surface of the tube retainer. Once the hanging assembly is affixed to a door or a wall and the hanging tubes are positioned to suit the stroller design, a user can safely hang a stroller on the hanging tubes or swivel the tubes out of the way when not in use.

In an alternate embodiment, the stroller-hanging device may be incorporated into a multi-rack system utilizing a wall mounted track system.

The invention will be better understood and more apparent when consideration is given to the following detailed description. Such description makes reference to the annexed drawings wherein:

FIG. 1a is a perspective view of the stroller hanger assembly; FIG. 1b and FIG. 1c are exploded views of the hanger tube retainer assemblies.

Figure 3C:
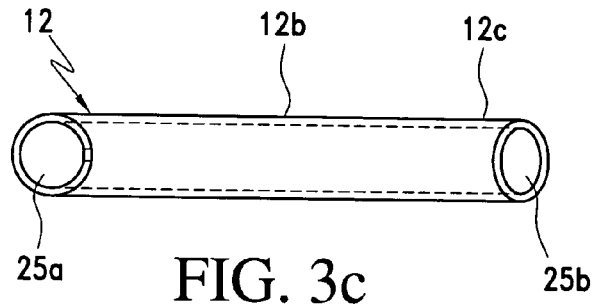
Figure 3A:
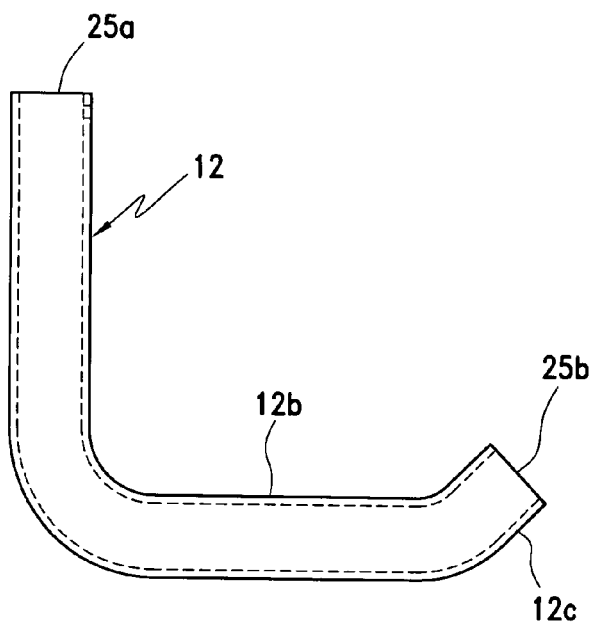
Figure 3B:
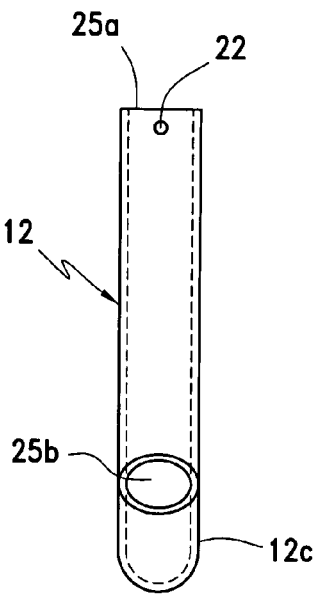
Figure 4:
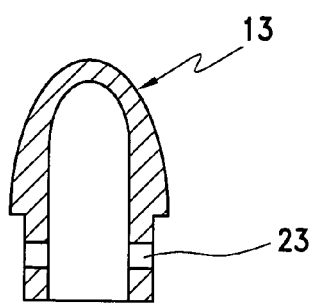
Figure 5A:
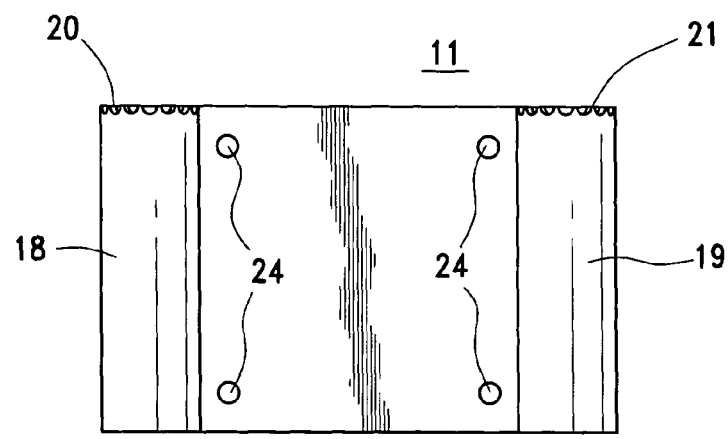
Figure 5B:
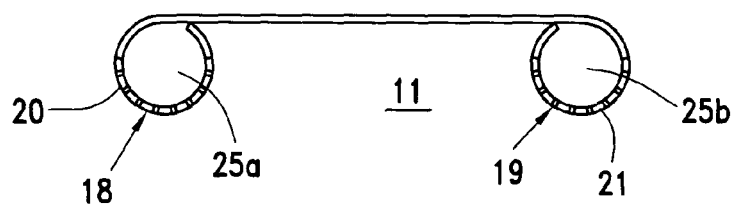
Figure 6:
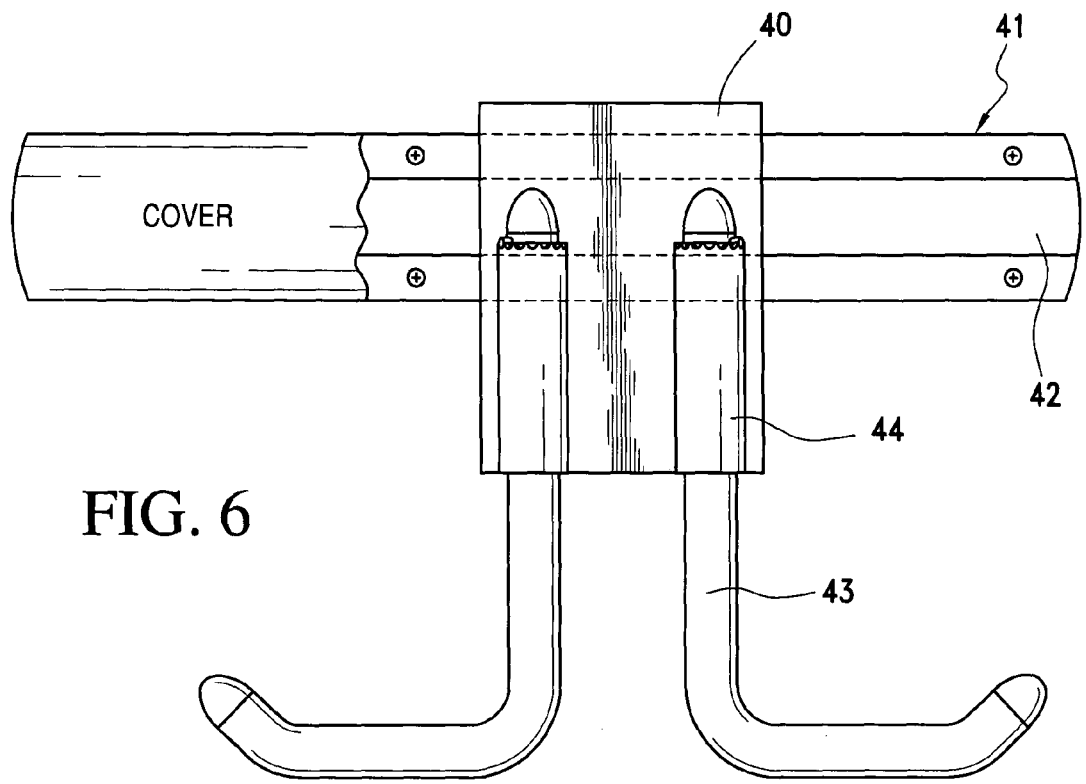

FIGS. 3a, 3b, and 3c are respectively the side, front, and top views of the hanger tube;

FIG. 4 is a cross-sectional view of the hanger tube retainer taken along the line 13-13 of FIG. 1;

FIG. 5a is an alternative embodiment of the invention, where the hanger bracket is wall-mounted and FIG. 5b is a top view of the bracket; and, FIG. 6 is a front view of an alternate embodiment of the invention using a wall mounted track system.

Referring now to FIG. 1 of the drawings, the invention 10 includes a hanger bracket 11, hanger tubes 12, a hanger tube retainers 13, and dowel pins 14. The hanger bracket 11, has two substantially rectangular surfaces 15 and 16 plus a lip 17 which extends downwardly from the surface 16. The first surface 15 extends downwards at a right angle to the surface 16. The second surface 16 is flush with the door top where the hanger assembly 10 is mounted. At its top end 15b, the hanger bracket 11 bends ninety (90) degrees and extends along the door top (not shown). Then the bracket extends downwardly a predetermined distance another ninety (90) degrees, forming a bracket shaped notch, which will rest on the top edge of the door where the assembly 10 is affixed.

At its lower end 15c, the hanger bracket surface 15 includes two integral hollow, substantially cylindrical tubes 18 and 19 at the far left and right sides 15d and 15e, respectively, of its first rectangular surface 15. The top edges of both cylinders have a plurality of notches 20 and 21 where the dowel pin 14 can rest. The notches permit the hanger tubes 12 to be spaced and locked in position according to dimensions of the stroller. The edges 31a and 32b of surface 15 include cutouts 33a and 33b respectively to permit a greater turning radius for the hanger tubes 12.

The hollow hanger tubes 12 are substantially L-shaped open-ended cylinders, with elongated bases 12b curved upwards at section 12c and bullet-shaped at their ends 12d. The upper portion of the hanger tubes 12 include an aperture 22 through which the cylindrical tubes 18 and 19 of the hanger bracket 11 are inserted. The upper portion of the hanger tubes 12 is then capped by the hanger tube retainer 13, which also includes an aperture 23. The circumference of both, the aperture 22 in the upper portion of the hanger tube 12 and the aperture 23 in the hanger tube retainer 13, are slightly larger than the circumference of the dowel pin 14. Both apertures 22 and 23 are aligned and the dowel pin 14 is inserted through both apertures, and rests on the notches 20 and 21 on the top edge of the cylindrical tubes 18 and 19 of the hanger bracket 11. The hanger tubes 12 are now secured to the hanger bracket 11, which is affixed to a door. A stroller may now safely hang on the elongated base 12b of the hanger tubes 12.

The positioning of the hanger tubes 12 can be modified by altering the position of the dowel pin 14 on the notches 18 and 19. This feature is useful to accommodate the variations in stroller size and permit the hanger tubes 12 to be swung out of the way when not in use.

Figure 2:
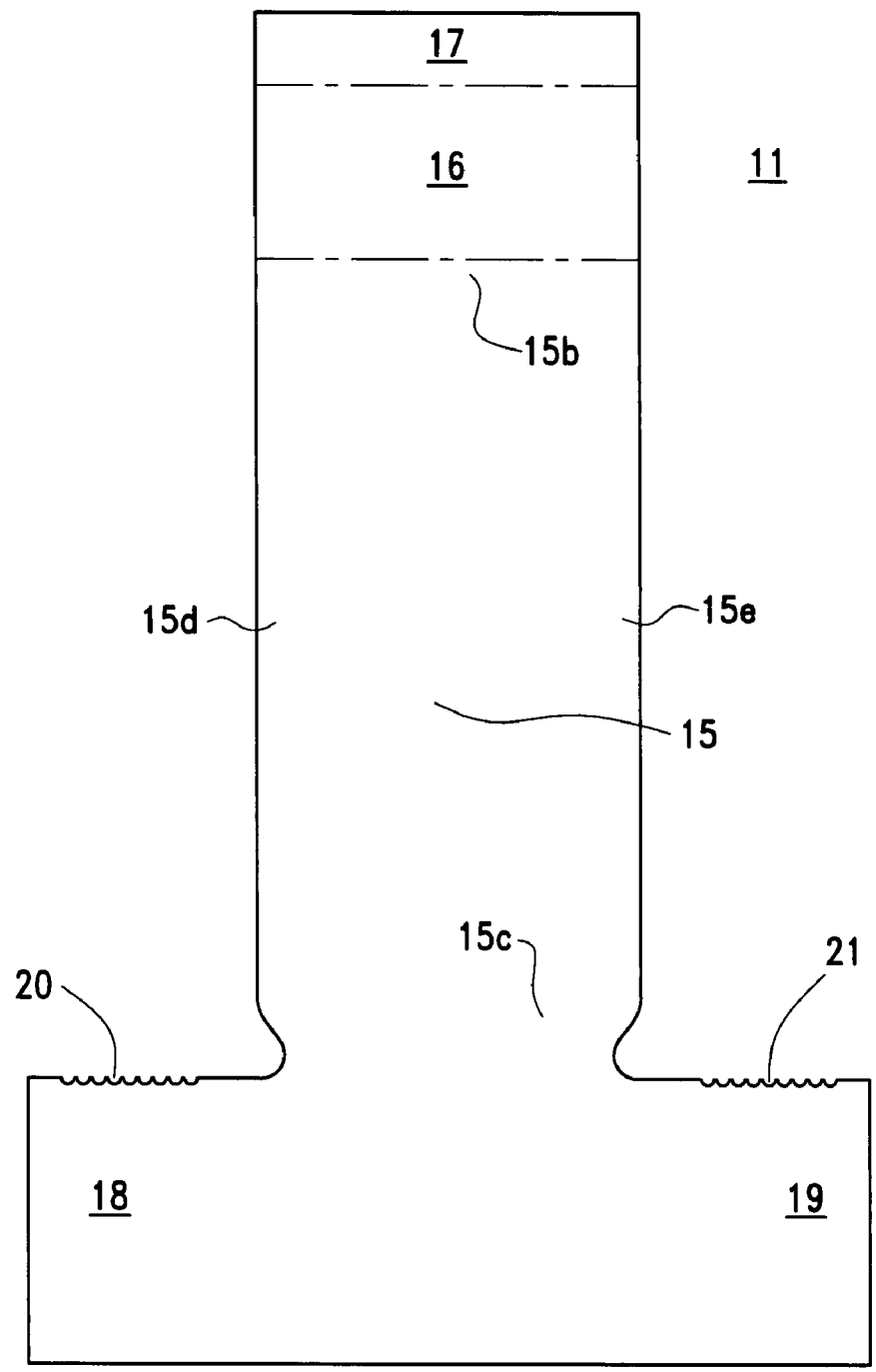
FIG. 2 is a front view of the hanger bracket.

FIG. 2 is a front view of the hanger bracket 11 before shaping. It provides an understanding of the dimensions of the hanger bracket 11, including the location of the bends in the upper portion, and the hollow substantially cylindrical tubes 18 and 19, which are formed in the bottom portion. The bracket 11 may be produced in a single stamping.

FIGS. 3a, 3b, and 3c show a side, front, and top view, respectively, of the hanger tube 12. These views provide an understanding of the dimensions of the hanger tube 12, including the length of the elongated base 12b, the curvature at its edge 12c, and the location of the aperture 22.

FIG. 4 shows a cross-sectional view of the hanger tube retainer 13 within which the hanger is slidably mounted. It provides an understanding of the dimensions of the hanger tube retainer 13, including the positioning of the aperture 23 through which the dowel pin 14 is inserted. The retainer 13 is inserted into the apertures 25a and 25b in a force fit. The curved bullet shaped configuration of the plastic retainer 13 is a safety feature and protects the stroller handles, which rest on the base 12b of the hanger tubes 12.

FIGS. 5a and 5b disclose another embodiment of the present invention, where the hanger bracket 11 is wall mounted. At its sides, the hanger bracket 11 includes two hollow, substantially cylindrical tubes 18 and 19 at the far left and right sides, respectively. The length of the hanger bracket 11 is equivalent to the length of the cylindrical tubes 18 and 19 at its far ends. Each of the four corners of the hanger bracket 11 contains an aperture 24 through which the assembly 10 can be affixed to the wall. The remainder of the assembly 10 is designed as in FIG. 1.

Another alternative embodiment of the present invention includes a spacer in the hanger bracket 11 of the door-mounted assembly 10. The spacer is found in the bracket portion 16 and is slidable between the ends of surface 16. The spacer is adjustable, allowing the user to accommodate the varying door thicknesses.

FIG. 6 shows an alternate embodiment of the invention wherein a hanger bracket 40 is mounted to a wall mounted track system 41 which includes a recess 42. A rear hanger protrusion (not shown) engages the recess 42 and slides therealong so that several strollers may be mounted on the track system 41. Pivoting stroller hooks 43 may be mounted to the bracket similar to FIG. 1 with the hooks located in hanger tube retainers 44.

While preferred embodiments of a robust, yet flexible device to hang a stroller have been described in detail, it should be apparent that modifications and variations are possible, all of which fall within the scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specifications are intended to be encompassed by the present invention.

What is claimed is:

1. A device for hanging a stroller on a door having front and rear surfaces and a top surface therebetween comprises:
   a hanger bracket having a first substantially rectangular face portion having an outer surface and an inner surface, and an upper bracket end and a lower bracket end and opposite sides extending along the rectangle face portion, a second substantially rectangular intermediate portion extending outwardly from the upper end at a 90° angle and a lip portion extending downwardly at a 90° angle to the second substantially rectangular intermediate surface wherein the first substantially rectangular bracket portion the second intermediate bracket portion and the lip portion hold the hanger bracket in position on a door;
   a pair of hollow cylindrical tubes each located along opposite sides of the outer surface of the first rectangular portion;
   a curved hollow hanger tube having an elongated end portion slidably mounted in each cylindrical tube and rotatable to various locked positions, said hanger tubes each having an outwardly extending portion to support the stroller and a hanger tube retainer mounted in each open end of the hanger tubes and said hanger tubes being rotatable into a plane parallel to the first bracket face portion when not in use and wherein the hanger tubes include an upper end transverse aperture; and
   wherein the hollow cylindrical tubes each include an upper periphery having a series of toothed notches thereabout, and further including a pin inserted into the aperture in the hanger tube and extending outwardly therefrom to lock the hanger tube in a selected fixed position on the toothed notches.

2. A device for hanging a stroller on a wall comprises:
   a hanger bracket having a substantially rectangular surface and a plurality of spaced apertures;
   separate fastening means insertable into the apertures to affix the bracket to a wall;
   a hollow cylindrical end portion extending along the outer portion of the bracket on each opposite side, said portion having a toothed upper periphery;
   a curved hollow hanger tube slidably mounted in each cylindrical tube and rotatable to various locked positions, said hanger tubes having an outwardly extending portion to support a stroller and said hanger tubes being rotatable adjacent the door when not in use; and,
   wherein the hanger tubes each include an outwardly projecting pin to engage the teeth on the upper periphery of cylindrical end portion to lock the tubes in position.

* * * * *